(12) United States Patent
Grichnik et al.

(10) Patent No.: US 7,483,774 B2
(45) Date of Patent: Jan. 27, 2009

(54) METHOD AND SYSTEM FOR INTELLIGENT MAINTENANCE

(75) Inventors: Anthony J. Grichnik, Peoria, IL (US); Michael Seskin, Cardiff, CA (US)

(73) Assignee: Caterpillar Inc., Peoria, IL (US)

( * ) Notice: Subject to any disclaimer, the term of this patent is extended or adjusted under 35 U.S.C. 154(b) by 88 days.

(21) Appl. No.: 11/642,914

(22) Filed: Dec. 21, 2006

(65) Prior Publication Data
US 2008/0154459 A1   Jun. 26, 2008

(51) Int. Cl.
*G06F 7/00* (2006.01)
*G06F 19/00* (2006.01)
(52) U.S. Cl. .......................................... 701/29; 701/30
(58) Field of Classification Search ............. 701/29–36, 701/102–106; 340/438, 439
See application file for complete search history.

(56) References Cited

U.S. PATENT DOCUMENTS

| | | | |
|---|---|---|---|
| 3,316,395 | A | 4/1967 | Lavin |
| 4,136,329 | A | 1/1979 | Trobert |
| 4,533,900 | A | 8/1985 | Muhlberger et al. |
| 5,014,220 | A | 5/1991 | McMann et al. |
| 5,163,412 | A | 11/1992 | Neu et al. |
| 5,262,941 | A | 11/1993 | Saladin et al. |
| 5,341,315 | A | 8/1994 | Niwa et al. |
| 5,386,373 | A | 1/1995 | Keeler et al. |
| 5,434,796 | A | 7/1995 | Weininger |
| 5,539,638 | A | 7/1996 | Keeler et al. |
| 5,548,528 | A | 8/1996 | Keeler et al. |
| 5,561,610 | A | 10/1996 | Schricker et al. |

(Continued)

FOREIGN PATENT DOCUMENTS

EP    1103926    5/2001

(Continued)

OTHER PUBLICATIONS

Pending US nonprovisional application entitled "Diagnostic and Prognostic Method and System," by Anthony Grichnik et al., U.S. Appl. No. 11/101,544, filed Apr. 8, 2005.

(Continued)

*Primary Examiner*—Richard M. Camby
(74) *Attorney, Agent, or Firm*—Finnegan, Henderson, Farabow, Garrett & Dunner

(57) ABSTRACT

A method is provided for reconfiguring an operational system having a plurality of input parameters and a plurality of output parameters. The method may include obtaining a maintenance schedule of the system and obtaining a set of actual values of the plurality of input parameters and corresponding actual values of the plurality of output parameters. The method may also include calculating corresponding model values of the plurality of output parameters based on an established process model indicative of interrelationships between the plurality of input parameters and the plurality of output parameters. Further, the method may include determining a divergence trend based on current divergences between the actual values and the model values of the plurality of output parameters and determining a desired set of values of the plurality of output parameters based on the divergence trend and the maintenance schedule. The method may also include providing a desired set of input constraints required to achieve the desired set of values of the plurality of output parameters based on the divergence trend and maintenance schedule.

24 Claims, 7 Drawing Sheets

U.S. PATENT DOCUMENTS

| | | | |
|---|---|---|---|
| 5,566,091 A | 10/1996 | Schricker et al. | |
| 5,585,553 A | 12/1996 | Schricker | |
| 5,594,637 A | 1/1997 | Eisenberg et al. | |
| 5,598,076 A | 1/1997 | Neubauer et al. | |
| 5,604,306 A | 2/1997 | Schricker | |
| 5,604,895 A | 2/1997 | Raimi | |
| 5,608,865 A | 3/1997 | Midgely et al. | |
| 5,666,297 A | 9/1997 | Britt et al. | |
| 5,682,317 A | 10/1997 | Keeler et al. | |
| 5,698,780 A | 12/1997 | Mizutani et al. | |
| 5,727,128 A | 3/1998 | Morrison | |
| 5,750,887 A | 5/1998 | Schricker | |
| 5,752,007 A | 5/1998 | Morrison | |
| 5,835,902 A | 11/1998 | Jannarone | |
| 5,842,202 A | 11/1998 | Kon | |
| 5,914,890 A | 6/1999 | Sarangapani et al. | |
| 5,925,089 A | 7/1999 | Fujime | |
| 5,950,147 A | 9/1999 | Sarangapani et al. | |
| 5,966,312 A | 10/1999 | Chen | |
| 5,987,976 A | 11/1999 | Sarangapani | |
| 6,086,617 A | 7/2000 | Waldon et al. | |
| 6,092,016 A | 7/2000 | Sarangapani et al. | |
| 6,119,074 A | 9/2000 | Sarangapani | |
| 6,145,066 A | 11/2000 | Atkin | |
| 6,195,648 B1 | 2/2001 | Simon et al. | |
| 6,199,007 B1 | 3/2001 | Zavarehi et al. | |
| 6,208,982 B1 | 3/2001 | Allen, Jr. et al. | |
| 6,223,133 B1 | 4/2001 | Brown | |
| 6,236,908 B1 | 5/2001 | Cheng et al. | |
| 6,240,343 B1 | 5/2001 | Sarangapani et al. | |
| 6,269,351 B1 | 7/2001 | Black | |
| 6,298,718 B1 | 10/2001 | Wang | |
| 6,370,544 B1 | 4/2002 | Krebs et al. | |
| 6,405,122 B1 | 6/2002 | Yamaguchi | |
| 6,438,430 B1 | 8/2002 | Martin et al. | |
| 6,442,511 B1 | 8/2002 | Sarangapani et al. | |
| 6,477,660 B1 | 11/2002 | Sohner | |
| 6,513,018 B1 | 1/2003 | Culhane | |
| 6,546,379 B1 | 4/2003 | Hong et al. | |
| 6,584,768 B1 | 7/2003 | Hecker et al. | |
| 6,594,989 B1 | 7/2003 | Hepburn et al. | |
| 6,698,203 B2 | 3/2004 | Wang | |
| 6,711,676 B1 | 3/2004 | Zomaya et al. | |
| 6,721,606 B1 | 4/2004 | Kaji et al. | |
| 6,725,208 B1 | 4/2004 | Hartman et al. | |
| 6,763,708 B2 | 7/2004 | Ting et al. | |
| 6,775,647 B1 | 8/2004 | Evans et al. | |
| 6,785,604 B2 | 8/2004 | Jacobson | |
| 6,810,442 B1 | 10/2004 | Lin et al. | |
| 6,823,675 B2 | 11/2004 | Brunell et al. | |
| 6,859,770 B2 | 2/2005 | Ramsey | |
| 6,859,785 B2 | 2/2005 | Case | |
| 6,865,883 B2 | 3/2005 | Gomulka | |
| 6,882,929 B2 | 4/2005 | Liang et al. | |
| 6,895,286 B2 | 5/2005 | Kaji et al. | |
| 6,935,313 B2 | 8/2005 | Jacobson | |
| 6,941,287 B1 | 9/2005 | Vaidyanathan et al. | |
| 6,952,662 B2 | 10/2005 | Wegerich et al. | |
| 6,976,062 B1 | 12/2005 | Denby et al. | |
| 7,000,229 B2 | 2/2006 | Gere | |
| 7,024,343 B2 | 4/2006 | El-Ratal | |
| 7,027,953 B2 | 4/2006 | Klein | |
| 7,035,834 B2 | 4/2006 | Jacobson | |
| 7,117,079 B2 | 10/2006 | Streichsbier et al. | |
| 7,124,047 B2 | 10/2006 | Zhang et al. | |
| 7,127,892 B2 | 10/2006 | Akins et al. | |
| 7,174,284 B2 | 2/2007 | Dolansky et al. | |
| 7,178,328 B2 | 2/2007 | Solbrig | |
| 7,191,161 B1 | 3/2007 | Rai et al. | |
| 7,194,392 B2 | 3/2007 | Tuken et al. | |
| 7,213,007 B2 | 5/2007 | Grichnik | |
| 7,356,393 B1* | 4/2008 | Schlatre et al. | 701/33 |
| 7,369,925 B2* | 5/2008 | Morioka et al. | 701/29 |
| 2002/0014294 A1 | 2/2002 | Okano et al. | |
| 2002/0016701 A1 | 2/2002 | Duret et al. | |
| 2002/0042784 A1 | 4/2002 | Kerven et al. | |
| 2002/0049704 A1 | 4/2002 | Vanderveldt et al. | |
| 2002/0103996 A1 | 8/2002 | LeVasseur et al. | |
| 2002/0198821 A1 | 12/2002 | Munoz | |
| 2003/0018503 A1 | 1/2003 | Shulman | |
| 2003/0055607 A1 | 3/2003 | Wegerich et al. | |
| 2003/0093250 A1 | 5/2003 | Goebel | |
| 2003/0126053 A1 | 7/2003 | Boswell et al. | |
| 2003/0126103 A1 | 7/2003 | Chen et al. | |
| 2003/0130855 A1 | 7/2003 | Babu et al. | |
| 2003/0167354 A1 | 9/2003 | Peppers et al. | |
| 2003/0187567 A1 | 10/2003 | Sulatisky et al. | |
| 2003/0187584 A1 | 10/2003 | Harris | |
| 2003/0200296 A1 | 10/2003 | Lindsey | |
| 2004/0030420 A1 | 2/2004 | Ulyanov et al. | |
| 2004/0034857 A1 | 2/2004 | Mangino et al. | |
| 2004/0059518 A1 | 3/2004 | Rothschild | |
| 2004/0077966 A1 | 4/2004 | Yamaguchi et al. | |
| 2004/0122702 A1 | 6/2004 | Sabol et al. | |
| 2004/0122703 A1 | 6/2004 | Walker et al. | |
| 2004/0128058 A1 | 7/2004 | Andres et al. | |
| 2004/0135677 A1 | 7/2004 | Asam | |
| 2004/0138995 A1 | 7/2004 | Hershkowitz et al. | |
| 2004/0153227 A1 | 8/2004 | Hagiwara et al. | |
| 2004/0230404 A1 | 11/2004 | Messmer et al. | |
| 2004/0267818 A1 | 12/2004 | Hartenstine | |
| 2005/0047661 A1 | 3/2005 | Mauer | |
| 2005/0055176 A1 | 3/2005 | Clarke et al. | |
| 2005/0091093 A1 | 4/2005 | Bhaskaran et al. | |
| 2005/0209943 A1 | 9/2005 | Ballow et al. | |
| 2005/0210337 A1 | 9/2005 | Chester et al. | |
| 2005/0240539 A1 | 10/2005 | Olavson | |
| 2005/0261791 A1 | 11/2005 | Chen et al. | |
| 2005/0262031 A1 | 11/2005 | Saidi et al. | |
| 2005/0278227 A1 | 12/2005 | Esary et al. | |
| 2005/0278432 A1 | 12/2005 | Feinleib et al. | |
| 2006/0010057 A1 | 1/2006 | Bradway et al. | |
| 2006/0010142 A1 | 1/2006 | Kim et al. | |
| 2006/0010157 A1 | 1/2006 | Dumitrascu et al. | |
| 2006/0025897 A1 | 2/2006 | Shostak et al. | |
| 2006/0026270 A1 | 2/2006 | Sadovsky et al. | |
| 2006/0026587 A1 | 2/2006 | Lemarroy et al. | |
| 2006/0064474 A1 | 3/2006 | Feinleib et al. | |
| 2006/0068973 A1 | 3/2006 | Kappauf et al. | |
| 2006/0129289 A1 | 6/2006 | Kumar et al. | |
| 2006/0130052 A1 | 6/2006 | Allen et al. | |
| 2006/0229753 A1 | 10/2006 | Seskin et al. | |
| 2006/0229769 A1 | 10/2006 | Grichnik et al. | |
| 2006/0229854 A1 | 10/2006 | Grichnik et al. | |
| 2006/0230018 A1 | 10/2006 | Grichnik et al. | |
| 2006/0230097 A1 | 10/2006 | Grichnik et al. | |
| 2006/0230313 A1 | 10/2006 | Grichnik et al. | |
| 2006/0241923 A1 | 10/2006 | Xu et al. | |
| 2006/0247798 A1 | 11/2006 | Subbu et al. | |
| 2007/0061144 A1 | 3/2007 | Grichnik et al. | |
| 2007/0094048 A1 | 4/2007 | Grichnik | |
| 2007/0094181 A1 | 4/2007 | Tayebnejad et al. | |
| 2007/0118338 A1 | 5/2007 | Grichnik et al. | |
| 2007/0124237 A1 | 5/2007 | Sundararajan et al. | |
| 2007/0150332 A1 | 6/2007 | Grichnik et al. | |
| 2007/0168494 A1 | 7/2007 | Liu et al. | |
| 2007/0179769 A1 | 8/2007 | Grichnik et al. | |
| 2007/0203864 A1 | 8/2007 | Grichnik | |
| 2008/0154811 A1 | 6/2008 | Grichnik et al. | |

FOREIGN PATENT DOCUMENTS

| | | |
|---|---|---|
| EP | 1367248 | 12/2003 |
| EP | 1418481 | 5/2004 |

| JP | 10-332621 | 12/1998 |
| JP | 11-351045 | 12/1999 |
| JP | 2002-276344 | 9/2002 |
| WO | 1997/042581 | 11/1997 |
| WO | 2002/057856 | 7/2002 |
| WO | 2006/017453 | 2/2006 |

OTHER PUBLICATIONS

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al. "Estimating Distributions in Genetic Algorithms," ISCIS 2003, LNCS 2869, 2003, pp. 521-528.

Galperin, G., et al. "Parallel Monte-Carlo Simulation of Neural Network Controllers," available at http://www-fp.mcs.anl.gov/ccst/research/reports_pre1998/neural_network/galperin.html, printed Mar. 11, 2005 (6 pages).

Gletsos et al., "A Computer-Aided Diagnostic System to Characterize CT Focal Liver Lesions: Design and Optimization of a Neural Network Classifier," IEEE Transactions on Information Technology in Biomedicine, vol. 7, No. 3, Sep. 2003, pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/529,267, filed Sep. 29, 2006, entitled Virtual Sensor Based Engine Control System and Method.

Grichnik et al., Copending U.S. Appl. No. 11/730,363, filed Mar. 30, 2007, entitled Prediction Based Engine Control System and Method.

Grichnik et al., Copending U.S. Appl. No. 11/812,164, filed Jun. 15, 2007, entitled Virtual Sensor System and Method.

Grichnik et al., Copending U.S. Appl. No. 11/979,408, filed Nov. 2, 2007, entitled Virtual Sensor System Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. 1335 (2002), pp. 667-670.

Ko et al., "Application of Artifical Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apt. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modeling of the Emissions and Performance of a Heavy-Duty Diesel Engine," Proc. Instu. Mech. Engrs., vol. 214, Part D (2000), pp. 111-126.

Traver, Michael L. et al., "A Neural Network-Based Virtual NOx Sensor for Diesel Engines," West Virginia University, Mechanical and Aerospace Engineering Dept., Morgantown, WV 26506-6101, 6106, 7 pages.

Traver, Michael L. et al., "A Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi Sysetm," Technometrics, Feb. 2003, vol. 45, No. 1 (15 pages).

Wu et al., "Cam-phasing Optimization Using Artificial Neural Networks as Surrogate Models--Fuel Consumption and Nox Emissions," SAE Technical Paper Series, 2006, 01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95,pp. 2221-2226.

* cited by examiner

METHOD AND SYSTEM FOR INTELLIGENT MAINTENANCE

TECHNICAL FIELD

This disclosure relates generally to control and diagnostic systems and, more particularly, to process model based diagnostics and maintenance scheduling technologies.

BACKGROUND

Modern machines often are equipped with complex systems to support a wide range of operations. The operational conditions of these complex systems, such as an engine system, may need to be monitored in order to diagnose and/or predict certain failures of the systems. A wide variety of techniques and apparatus have been developed for diagnosing engines and engine control systems, including expert systems, fuzzy logic based systems, and neural network models. These techniques and apparatus may be used for diagnostic and/or prognostic purposes. A diagnostic system may be used to identify a root source of a failure after the failure has occurred, and a prognostic system may be used to identify a root source of a failure before the failure has occurred.

Some of these conventional techniques operate only to classify operation conditions into two categories, normal or abnormal, without offering further analysis to identify possible causes for failures. Other conventional techniques, such as described in U.S. Pat. No. 6,240,343 B1 issued to Sarangapani et al. on May 29, 2001, use differences between actual values from an engine and model values from a process model as ordinary inputs to the process model to generate output patterns of failures based on prior knowledge of the system. However, such techniques may require a large amount of computational time and often fail to identify relationships between the failures and particular inputs and their control logics.

Further, conventional techniques often fail to maintain or repair the complex systems using the diagnostic and analysis information. For example, conventional techniques may often fail to determine time and type of a scheduled maintenance based on a predicted root source of a failure before the failure has occurred. These conventional techniques may also often fail to configure the operational conditions of the complex systems for continuous operation after a failure has occurred or a potential failure has been predicted but before a scheduled maintenance can be performed.

Methods and systems consistent with certain features of the disclosed systems are directed to solving one or more of the problems set forth above.

SUMMARY OF THE INVENTION

One aspect of the present disclosure includes a method for reconfiguring an operational system having a plurality of input parameters and a plurality of output parameters. The method may include obtaining a maintenance schedule of the system and obtaining a set of actual values of the plurality of input parameters and corresponding actual values of the plurality of output parameters. The method may also include calculating corresponding model values of the plurality of output parameters based on an established process model indicative of interrelationships between the plurality of input parameters and the plurality of output parameters. Further, the method may include determining a divergence trend based on current divergences between the actual values and the model values of the plurality of output parameters and determining a desired set of values of the plurality of output parameters based on the divergence trend and the maintenance schedule. The method may also include providing a desired set of input constraints required to achieve the desired set of values of the plurality of output parameters based on the divergence trend and maintenance schedule.

Another aspect of the present disclosure includes a method for diagnosing a system having a plurality of input parameters and a plurality of output parameters. The method may include obtaining a set of actual values of the plurality of input parameters and corresponding actual values of the plurality of output parameters and calculating corresponding model values of the plurality of output parameters based on an established process model indicative of interrelationships between the plurality of input parameters and the plurality of output parameters. The method may also include determining a divergence trend based on current divergences between the actual values and the model values of the plurality of output parameters and determining a maintenance schedule of the system based on the divergence trend and the current divergences.

Another aspect of the present disclosure includes a machine. The machine may include an engine, an electronic control module, and a diagnostic system. The electronic control module may be configured to control operation of the engine by using actual values of one or more output parameters based on a plurality of input parameters. The diagnostic system may include a processor and the processor may be configured to obtain a maintenance schedule of the engine and to obtain a set of actual values of the plurality of input parameters and corresponding actual values of the plurality of output parameters. The processor may also be configured to calculate corresponding model values of the plurality of output parameters based on an established process model indicative of interrelationships between the plurality of input parameters and the plurality of output parameters. Further, the processor may be configured to determine a divergence trend based on current divergences between the actual values and the model values of the plurality of output parameters and to determine a desired set of values of the plurality of output parameters based on the divergence trend and the maintenance schedule and to provide a desired set of input constraints required to achieve the desired set of values of the plurality of output parameters based on the divergence trend and maintenance schedule.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
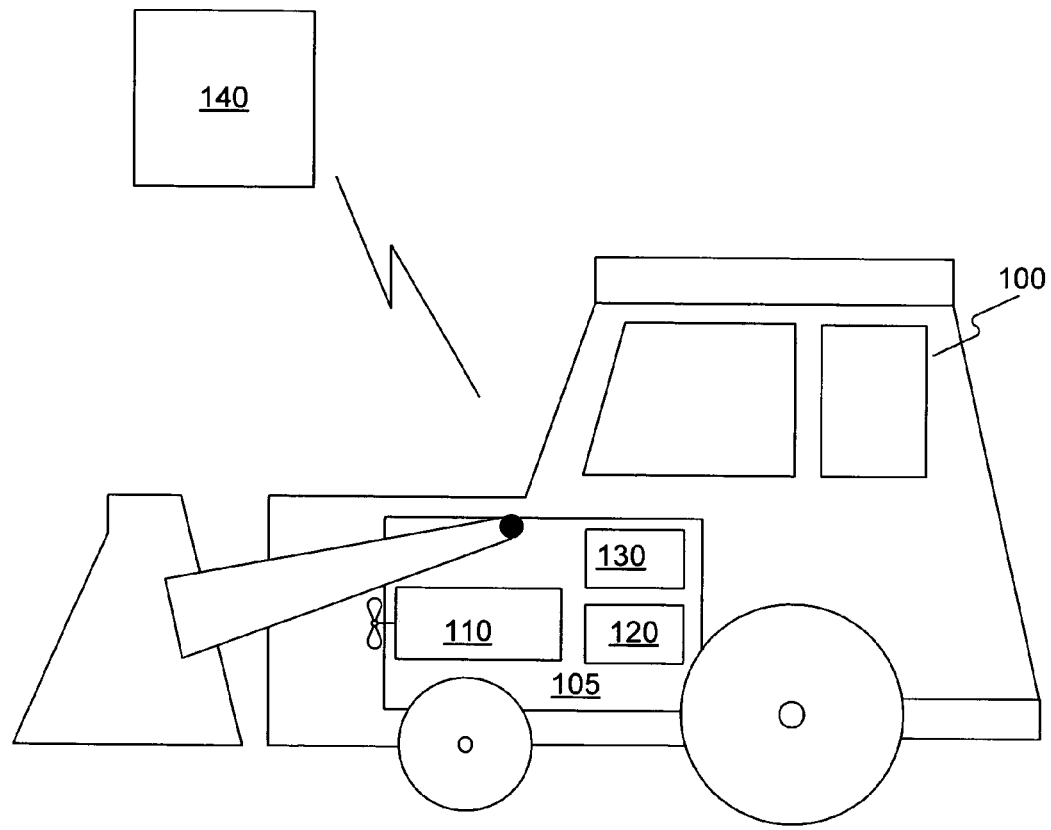
FIG. 1 shows an exemplary machine incorporating certain disclosed embodiments consistent with disclosed embodiments.

FIG. 1 illustrates an exemplary machine 100 in which features and principles consistent with certain disclosed embodiments may be incorporated. Machine 100 may refer to any type of fixed or mobile machine. For example, machine 100 may include non-mobile power generation systems, wheeled or tracked vehicles, maritime vessels, or aircrafts, etc. Although, as shown in FIG. 1, machine 100 is an earth handling type vehicle, it is contemplated that machine 100 may include any type of vehicle or stationary machine. Further, machine 100 may be conventionally powered, hybrid electric, and/or fuel cell powered.

As shown in FIG. 1, machine 100 may include an engine system 105. Engine system 105 may include an engine 110, an electronic control module (ECM) 120, and a diagnostic and analysis system 130. A server 140 may communicate with machine 100 via ECM 120 and/or diagnostic and analysis system 130. It is understood that the components are listed for illustrative purposes and that other components may also be included in machine 100.

Engine 110 may include any appropriate type of engine that generates power for machine 100, such as an internal combustion engine. ECM 120 may include any appropriate type of control system configured to perform engine control functions and/or any other machine control functions. Diagnostic and analysis system 130 may include any appropriate type of control system configured to perform engine diagnostic and analysis functions. In certain embodiments, diagnostic and analysis system 130 may coincide with ECM 120. Although diagnostic and analysis system 130 is shown configured for engine 110, diagnostic and analysis system 130 may be configured to perform diagnostic and analysis functions for other systems on machine 100, such as transmission systems, and/or hydraulics systems, etc. Further, ECM 120 and/or diagnostic and analysis system 130 may be implemented in any appropriate means. For example, all or part of ECM 120 and/or diagnostic and analysis system 130 may be implemented on a single semiconductor device such as a field programmable gate array (FPGA) or a similar device.

Further, server 140 may include any appropriate type of computer system for communicating with ECM 120, diagnostic and analysis system 130, and machine 100 to gather information about machine 100 and to perform certain control or administrative functions. For example, server 140 may notify a dealer or user of machine 100 to schedule a maintenance to maintain and/or repair machine 100 based on information from ECM 120 and/or diagnostic and analysis system 130. Further, server 140 may communicate with machine 100 via any appropriate communication means, such as a wireless communication channel or a wired communication channel.

Figure 2:
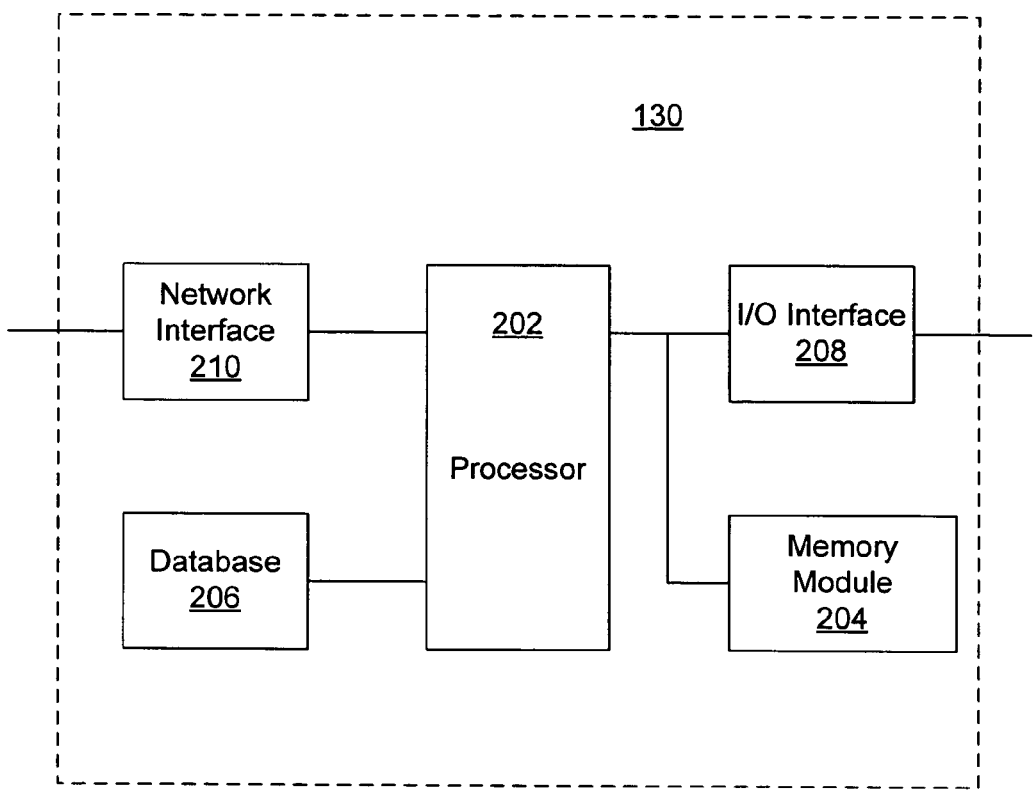
FIG. 2 shows a functional block diagram of an exemplary diagnostic and analysis system consistent with disclosed embodiments.

FIG. 2 shows a functional block diagram of an exemplary diagnostic and analysis system 130. As shown in FIG. 2, diagnostic and analysis system 130 may include a processor 202, a memory module 204, a database 206, an I/O interface 208, and a network interface 210. Other components, however, may also be included in diagnostic and analysis system 130.

Processor 202 may include any appropriate type of general purpose microprocessor, digital signal processor or microcontroller. Processor 202 may be configured as a separate processor module dedicated to controlling engine 110. Alternatively, processor 202 may be configured as a shared processor module for performing other functions of engine system 105.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of input parameters, output parameters, mathematical models, and/or any other control information. Further, I/O interface 206 may be used to connect various sensors or other components (not shown) to processor 202 for monitoring and controlling operations of engine system 105. Network interface 210 may include any appropriate type of network adaptor capable of communicating with other computer systems based on one or more communication protocols.

Figure 3:
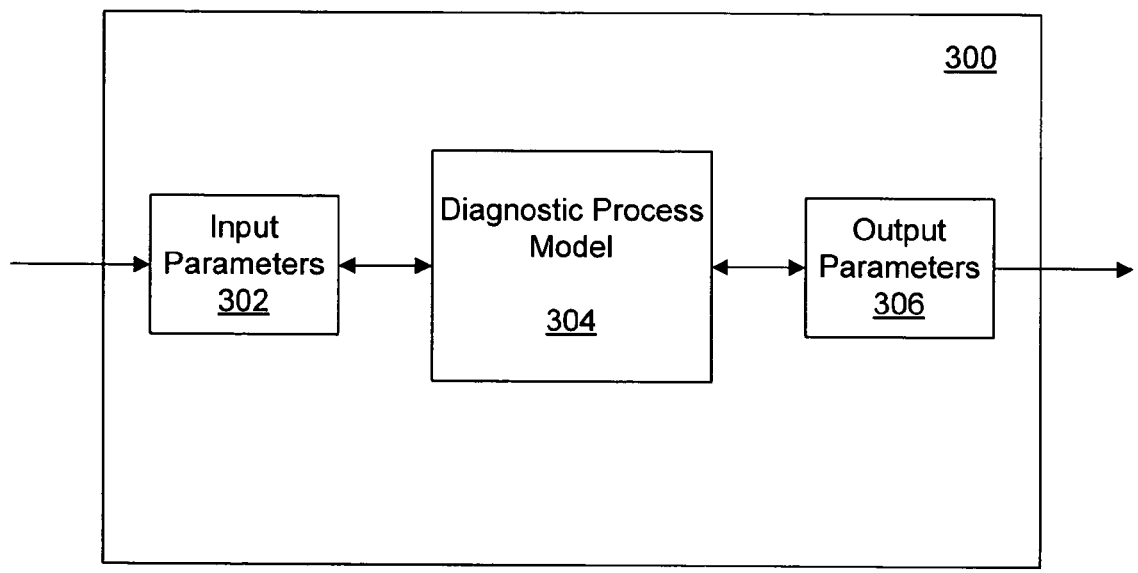
FIG. 3 shows a logical block diagram of an exemplary diagnostic model consistent with disclosed embodiments.

Diagnostic and analysis system 130 may include a process model related to operation of engine system 105. Processor 202 may execute computer software instructions to generate and/or operate a diagnostic model to provide diagnostic and analysis functions. FIG. 3 shows a logical block diagram of an exemplary diagnostic model 300 included in diagnostic and analysis system 130.

As shown in FIG. 3, diagnostic model 300 may include a diagnostic process model 304, input parameters 302, and output parameters 306. Diagnostic process model 304 may be established to build interrelationships between input parameters 302 and output parameters 306. After diagnostic process model 304 is established, values of input parameters 302 may be provided to diagnostic process model 304 to generate values of output parameters 306 based on the given values of input parameters 302 and the interrelationships between input parameters 302 and output parameters 306 established by diagnostic process model 304.

Diagnostic process model 304 may include any appropriate type of mathematical or physical model indicating interrelationships between input parameters 302 and output parameters 306. For example, diagnostic process model 304 may be a neural network based mathematical model that is trained to capture interrelationships between input parameters 302 and output parameters 306. Other types of mathematic models, such as fuzzy logic models, linear system models, and/or non-linear system models, etc., may also be used.

Because diagnostic model 300 may be provided to diagnose and analyze operations of engine system 105 (e.g., engine 110, ECM 120, etc.), diagnostic model 300 may use all or a subset of a plurality of input parameters of ECM 120. For example, input parameters 302 may include a gas pedal indication, a gear selection, atmospheric pressure, and engine temperature, etc., which are also provided to ECM 120 for operation of engine 110.

Diagnostic model 300 may also include certain output parameters of ECM 120. For example, output parameters 306 may include control parameters used by ECM to control engine 110, such as a throttle valve setting and boost control. Further, output parameters 306 may also include operational status of engine system 105. In operation, diagnostic model 300 may be provided with values of input parameters 302 and may generate values of output parameters 306 based on the interrelationship established between input parameters 302 and output parameters 306. The generated output parameter values may be further analyzed to monitor and/or adjust operational status of engine system 105.

Diagnostic process model 304 may be trained and validated using data records collected from a particular engine application for which diagnostic process model 304 is established. That is, diagnostic process model 304 may be established and/or operated according to particular rules corresponding to a particular type of model using the data records. The interrelationships of diagnostic process model 304 may also be verified by using part of the data records.

After diagnostic process model 304 is trained and validated, diagnostic process model 304 may be optimized to define a desired input space of input parameters 302 and/or a desired distribution of output parameters 306. That is, values of input parameters 302, values of output parameters 306; and/or interrelationships between input parameters 302 and output parameters 306 represented by diagnostic process model 304 may be optimized or adjusted. The validated or optimized diagnostic process model 304 may be used to produce corresponding values of output parameters 306 when provided with a set of values of input parameters 302.

The establishment and operations of diagnostic process model 304 may be carried out by processor 202 based on computer programs stored in or loaded to diagnostic model 300. Alternatively, the establishment of diagnostic process model 304 may be realized by other computer systems, such as a separate computer system (not shown) configured to create process models. The created process model may then be loaded to diagnostic model 300 (e.g., ECM 120 containing block 130) for operations.

Figure 4:
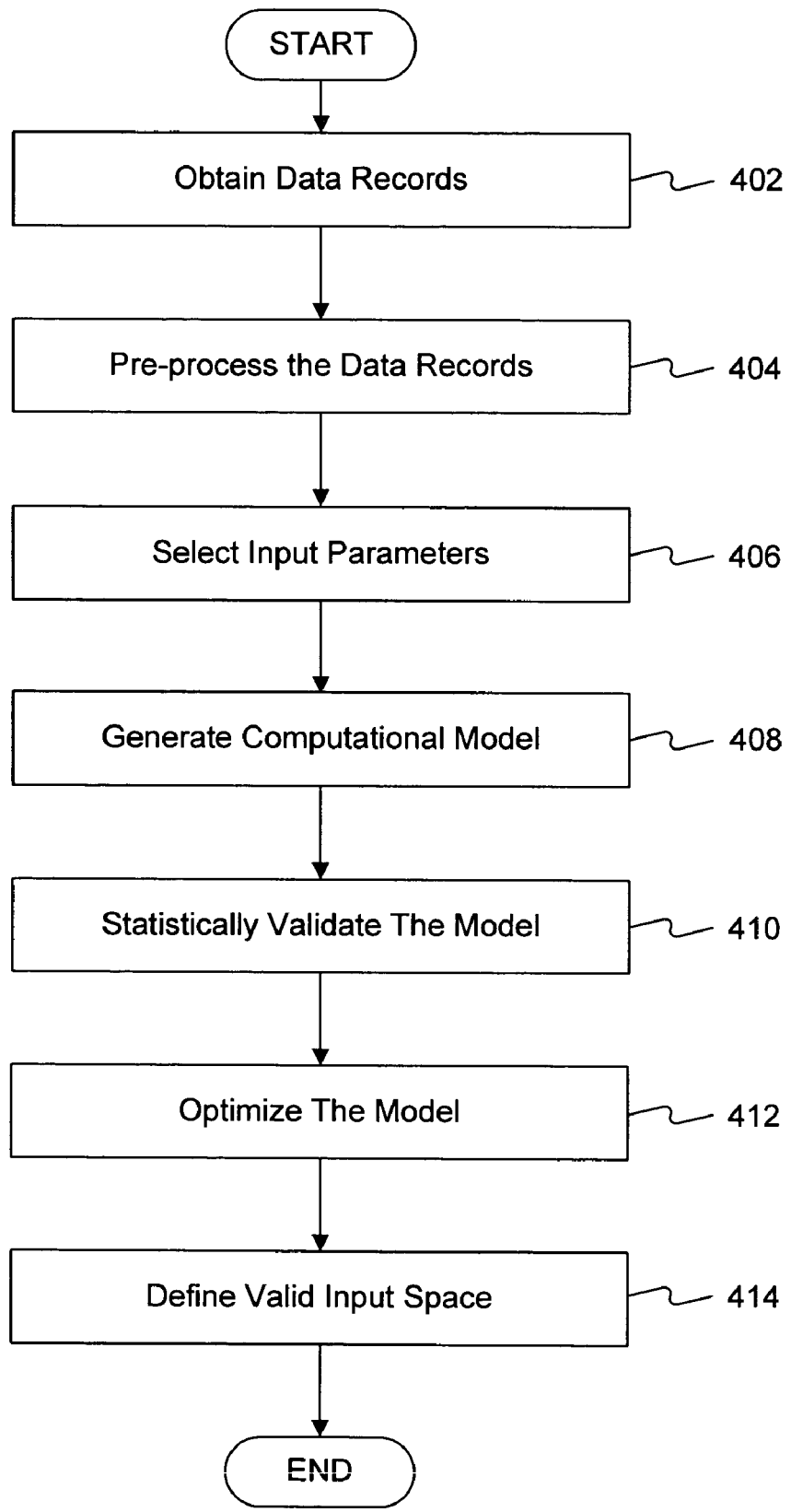
FIG. 4 shows an exemplary model generation and optimization process consistent with disclosed embodiments.

Processor 202 may perform a diagnostic process model generation and optimization process to generate and optimize diagnostic process model 304. FIG. 4 shows an exemplary model generation and optimization process performed by processor 202. As shown in FIG. 4, at the beginning of the model generation and optimization process, processor 202 may obtain data records associated with input parameters 302 and output parameters 306 (step 402).

The data records may be previously collected during a certain time period from a test engine and its electronic control module or from electronic control modules of a plurality of vehicles and engines. The data records may also be collected from experiments designed for collecting such data. Alternatively, the data records may be generated artificially by other related processes, such as a design process. The data records may also include training data used to build diagnostic process model 304 and testing data used to validate diagnostic process model 304. In addition, the data records may include simulation data used to observe and optimize diagnostic process model 304. Further, the data records may also reflect characteristics of input parameters 302 and output parameters 306, such as statistic distributions, normal ranges, and/or tolerances, etc.

Once the data records are obtained (step 402), processor 202 may pre-process the data records to clean up the data records for obvious errors and to eliminate redundancies (step 404). Processor 202 may remove approximately identical data records and/or remove data records that are out of a reasonable range in order to be meaningful for model generation and optimization. After the data records have been pre-processed, processor 202 may then select proper input parameters by analyzing the data records (step 406).

The data records may include many input variables. The number of input variables may be greater than the number of the input parameters or variables used for diagnostic model 300. For example, in addition to values corresponding to input parameters or variables of gas pedal indication, gear selection, atmospheric pressure, and engine temperature, the data records may also include input variables such as fuel indication, tracking control indication, and/or other engine parameters, etc.

In certain situations, the number of input variables may exceed the number of the data records and lead to sparse data scenarios. Some of the extra input variables may be omitted in certain mathematical models. The number of the input variables may need to be reduced to create mathematical models within practical computational time limits.

Processor 202 may select input parameters according to predetermined criteria. For example, processor 202 may choose input parameters by experimentation and/or expert opinions. Alternatively, in certain embodiments, processor 202 may select input parameters based on a mahalanobis distance between a normal data set and an abnormal data set of the data records. The normal data set and abnormal data set may be defined by processor 202 by any appropriate method. For example, the normal data set may include characteristic data associated with the input parameters that produce desired output parameter values. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as:

$$MD_i = (X_i - \mu_x)\Sigma^{-1}(X_i - \mu_x)' \qquad (1)$$

where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select a desired subset of input parameters such that the mahalanobis distance between the normal data set and the abnormal data set is maximized or optimized. A genetic algorithm may be used by processor 202 to search the input parameters for the desired subset with the purpose of maximizing the mahalanobis distance. Processor 202 may select a candidate subset of the input parameters based on a predetermined criteria and calculate a mahalanobis distance $MD_{normal}$ of the normal data set and a mahalanobis distance $MD_{abnormal}$ of the abnormal data set. Processor 202 may also calculate the mahalanobis distance between the normal data set and the abnormal data using the relationship $MD_x = MD_{normal} - MD_{abnormal}$. Other types of deviations, however, may also be used.

Processor 202 may select the candidate subset of the input parameters if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

After selecting input parameters (e.g., gas pedal indication, gear selection, atmospheric pressure, and temperature, etc.), processor 202 may generate a computational model (e.g., diagnostic model 300) to build interrelationships between input parameters 302 and output parameters 306 (step 408). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using selected data records. For example, the neural network computational model may include relationships between output parameters 306 (e.g., boost control, throttle valve setting, etc.) and input parameters 302 (e.g., gas pedal indication, gear selection, atmospheric pressure, and engine temperature, etc). The neural network computational model may be evaluated by predetermined criteria to determine whether the training is completed. For example, the criteria may include desired ranges of accuracy, time, and/or number of training iterations, etc.

After the neural network has been trained such that the computational model has initially been established based on the predetermined criteria, processor 202 may statistically validate the computational model (step 410). Statistical validation may refer to an analyzing process to compare outputs of the neural network computational model with actual outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, the computational model may be used to determine values of output parameters 306 when provided with values of input parameters 302. For example, processor 202 may use the computation model to determine throttle valve setting and boost control based on input values of gas pedal indication, gear selection, atmospheric pressure, and engine temperature, etc. That is, diagnostic model 300 may reflect reactions or control functions of a normal or historical engine system 105 including ECM 120 (i.e., a model of engine system 105) for the purposes of monitoring and diagnostics. The values of output parameters 306 may then be used to check operational status of ECM 120 and engine 110 or to control hardware devices of diagnostic and analysis system 130 or engine system 105.

Further, processor 202 may optimize the model by determining desired distributions of input parameters 302 based on relationships between input parameters 302 and desired distributions of output parameters 306 (step 412). Processor 202 may analyze the relationships between desired distributions of input parameters 302 and desired distributions of output parameters 306 based on particular applications. For example, if a particular application requires a higher fuel efficiency, processor 202 may use a small range for the throttle valve setting and use a large range for the boost control.

Processor 202 may run a simulation of the computational model to find a desired statistical distribution for an individual input parameter (e.g., gas pedal indication, gear selection, atmospheric pressure, or engine temperature, etc). That is, processor 202 may separately determine a distribution (e.g., mean, standard variation, etc.) of the individual input parameter corresponding to the normal ranges of output parameters 306. Processor 202 may then analyze and combine the separately obtained desired distributions for all the individual input parameters to determined concurrent desired distributions and characteristics for input parameters 302. The concurrent desired distribution may be different from separately obtained distributions.

Processor 202 may also determine desired statistical distribution of input parameters 302 based a similarity metric to the data records used to create the computation model. The similarity metric, as used herein, may refer to an indication of similarity between a set of values of input parameters 302 and overall values of input parameters 302 over the data records. For example, the similarity metric may be based on Euclidean distance between the set of values and overall values of input parameters 302, or may be based on Mahalanobis distance between the set of values and overall values of input parameters 302.

Alternatively, processor 202 may identify desired distributions of input parameters 302 simultaneously to maximize the probability of obtaining desired outcomes. In certain embodiments, processor 202 may simultaneously determine desired distributions of input parameters 302 based on zeta statistic. Zeta statistic may indicate a relationship between input parameters 302, their value ranges, and desired outcomes. Zeta statistic may be represented as $$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Processor 202 may identify a desired distribution of input parameters 302 such that the zeta statistic of the neural network computational model (i.e., diagnostic model 300) is maximized or optimized. An appropriate type of genetic algorithm may be used by processor 202 to search the desired distribution of input parameters 302 with the purpose of maximizing the zeta statistic. Processor 202 may select a candidate set of values of input parameters 302 with predetermined search ranges and run a simulation of the diagnostic model to calculate the zeta statistic parameters based on input parameters 302, output parameters 306, and the neural network computational model. Processor 202 may obtain $\bar{x}_i$ and $\sigma_i$ by analyzing the candidate set of input parameter values and obtain $\bar{x}_j$ and $\sigma_j$ by analyzing the outcomes of the simulation. Further, processor 202 may obtain $|S_{ij}|$ from the trained neural network as an indication of the impact of ith input on the jth outcome.

Processor 202 may select the candidate set of values of input parameters 302 if the genetic algorithm converges (i.e., the genetic algorithm finds the maximized or optimized zeta statistic of diagnostic model 300 corresponding to the candidate set of values of input parameters 302). If the genetic algorithm does not converge, a different candidate set of values of input parameters 302 may be created by the genetic algorithm for further searching. This searching process may continue until the genetic algorithm converges and a desired set of values of input parameters 302 is identified. Processor 202 may further determine desired distributions (e.g., mean and standard deviations) of input parameters 302 based on the desired input parameter value set. Once the desired distributions are determined, processor 202 may also define a valid input space which may include any input parameter value according to the desired distributions (step 414).

In one embodiment, statistical distributions of certain input parameters may be impossible or impractical to be controlled. For example, an input parameter may be associated with a physical attribute of a device that is constant, or the input parameter may be associated with a constant variable within a process model. These input parameters may be used in the zeta statistic calculations to search or identify desired distributions for other input parameters corresponding to constant values and/or statistical distributions of these input parameters.

Further, optionally, more than one diagnostic process models may be established. Multiple established diagnostic process models may be simulated by using any appropriate type of simulation method, such as statistical simulation. For example, around 150 models may be simulated. Output parameters 306 based on simulation of these multiple diagnostic process models may be compared to select a most-fit diagnostic process model or several most-fit diagnostic process models based on predetermined criteria, such as smallest variance with outputs from corresponding physical sensors, etc. The selected most-fit diagnostic process model 304 may be deployed in diagnostic and analysis system 130.

Figure 5:
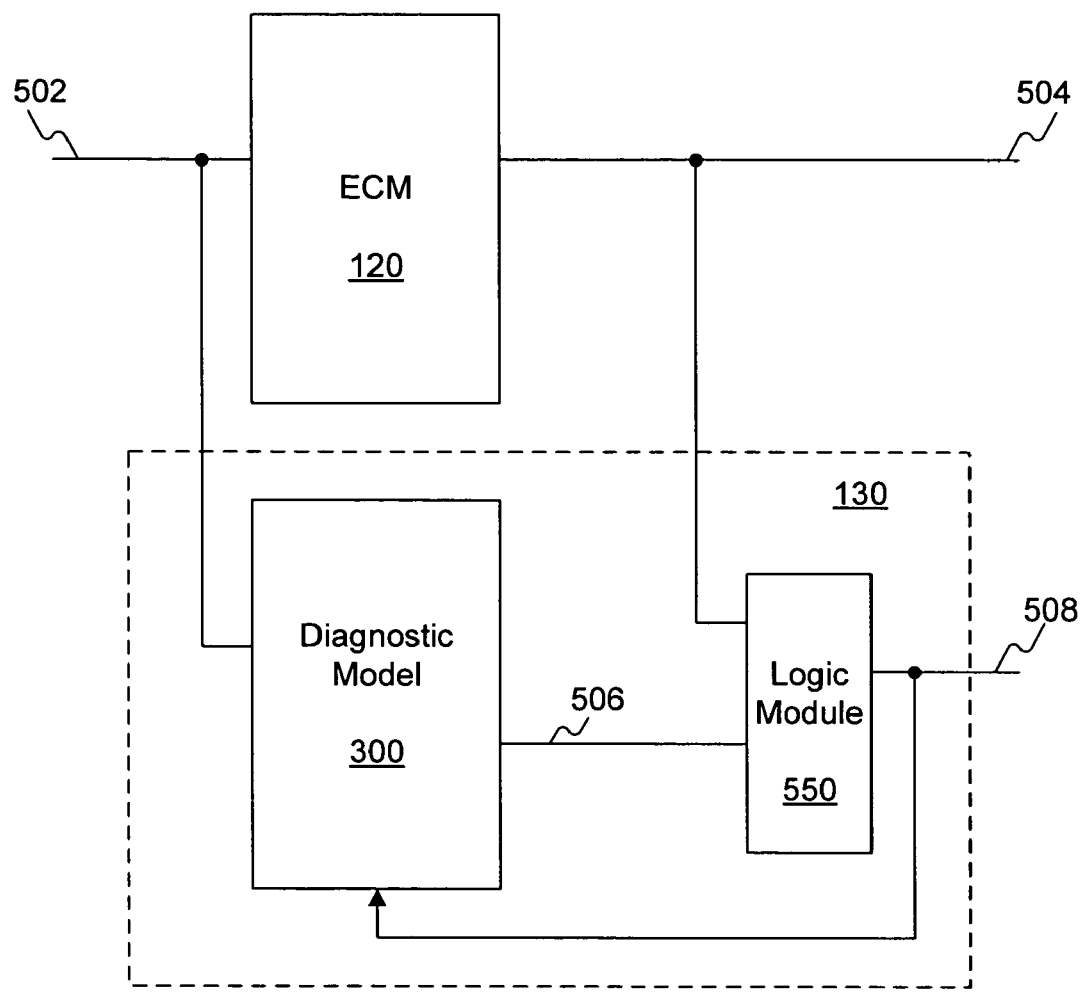
FIG. 5 shows a block diagram of an exemplary diagnostic and analysis environment consistent with disclosed embodiments.

After diagnostic process model 304 is trained, validated, optimized, and/or selected, ECM 120 and diagnostic and analysis system 130 may work together during operation of machine 100 to monitor and diagnose operation of engine system 105. FIG. 5 shows a block diagram of an exemplary diagnostic and analysis environment. As shown in FIG. 5, ECM 120 may be provided with input parameters 502 and may generate output parameters 504 for controlling engine 110. As explained above, input parameters 502 may also be provided to diagnostic model 300 as input parameters (e.g., input parameters 302, such as a gas pedal indication, a gear selection, atmospheric pressure, and engine temperature, etc.) and diagnostic model 300 may also generate output parameters 506 (e.g., output parameters 306, such as a throttle valve setting, and boost control). With respect to diagnostic model 300, input parameters 502 and output parameters 506 may corresponding to input parameters 302 and output parameters 306, respectively. Further, output parameters 506 may include other parameters, such as cost, time, or performance, etc., of diagnostic and analysis system 130.

Diagnostic and analysis system 130 may also include a logic module 550 to determine deviations between actual values of output parameters 504 of ECM 120 and values of output parameters 506 of diagnostic model 300. Logic module 350 may include any appropriate type of computer hardware component or software program configured to determine diagnostic actions need to be performed. A diagnostic output 508 may also be provided to notify and/or present results of operations of diagnostic and analysis system 130. Further, diagnostic output 508 may also be fed back to diagnostic model 300 for proper adjustment under certain circumstances.

Figure 6:
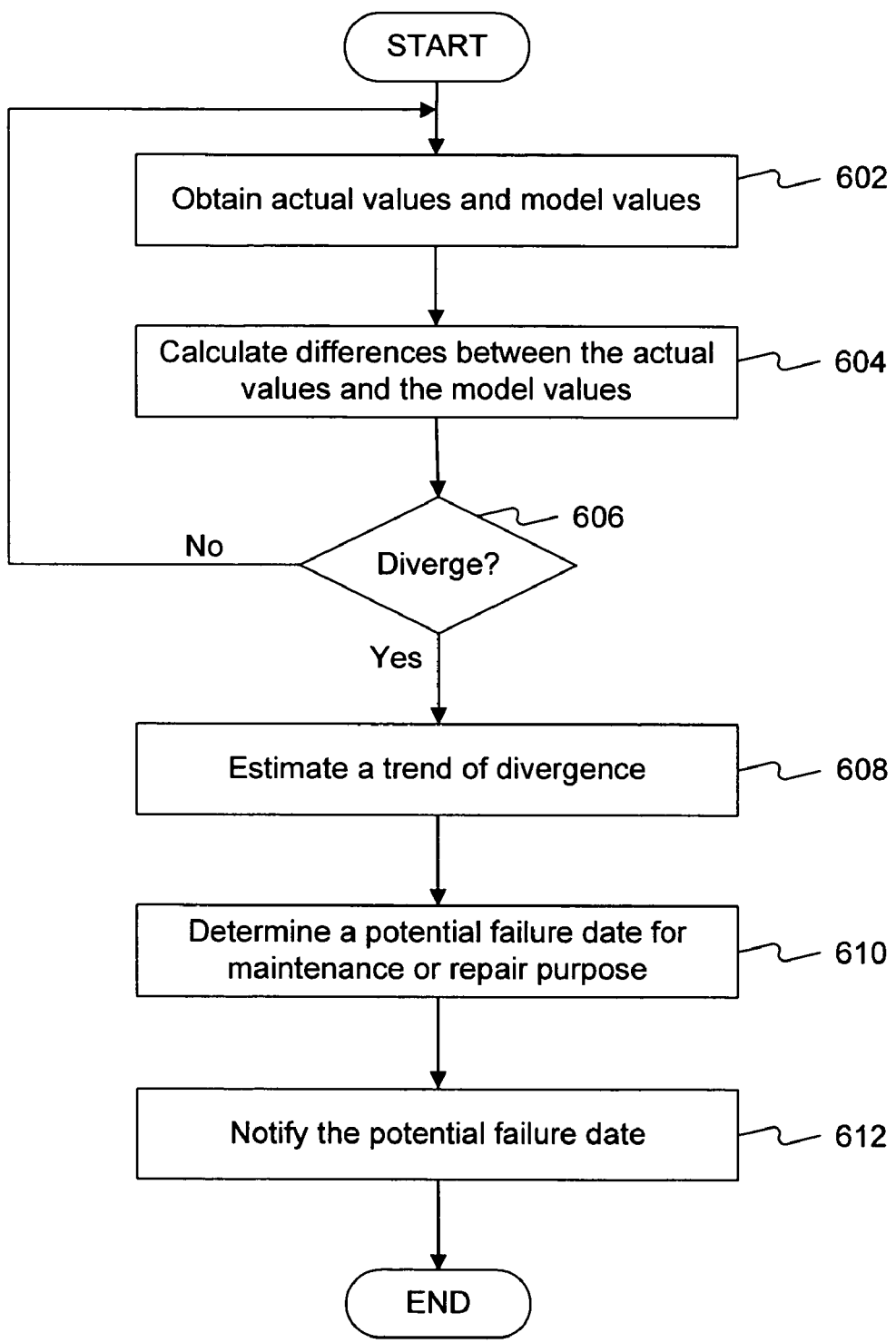
FIG. 6 shows an exemplary maintenance scheduling process consistent with disclosed embodiments.

In one embodiment, diagnostic and analysis system 130 may provide information on whether or when engine system 105 may need repair or maintenance. FIG. 6 illustrates an exemplary maintenance scheduling process performed by logic module 550 and, more specifically, by processor 202.

As shown in FIG. 6, processor 202 may obtain actual values and model values (step 602). For example, processor 202 may obtain values of output parameters 504 of ECM 120 as actual output parameter values and values of output parameters 506 of diagnostic model 300 as model output parameter values. Processor 202 may also calculate respective differences between the actual values and the model values (step 604). For example, processor 202 may calculate differences between the actual values and model values of throttle valve setting and differences between the actual values and model values of boost control. Other types of differences, however, may also be used.

Processor 202 may then determine whether the actual values diverge with the corresponding model values (step 606). To determine whether there is a divergence between an actual value of an output parameter of ECM 120 and a model value of a corresponding output parameter of diagnostic and analysis system 130, processor 202 may compare the difference between the actual value and the model value with a predetermined threshold. If the difference is beyond the predetermined threshold, processor 202 may determine that the actual value diverges from the model value (step 606; yes).

On the other hand, if the difference is below the threshold, processor 202 may determine that the actual value does not diverge from the model value (step 606; no). If processor 202 determines that the actual value does not diverges from the model value (step 606; no), processor 202 may continue the maintenance scheduling process from step 602. Optionally, processor 202 may also determine whether values of input parameters 502 are valid.

As explained above, diagnostic model 300 may have a valid input space optimized for input parameters 502 and input parameter 302. If processor 202 determines that a value of an input parameter (e.g., gas pedal indication, gear selection, atmospheric pressure, and engine temperature, etc.) is outside the valid input space (i.e., outside the range of a desired distribution of input parameters 302), processor 202 may determine that the values of input parameters 502 are invalid values. Because diagnostic model 300 may be generated and optimized to be operated based on the valid input space, processor 202 may determine that the model values may be inconclusive on determining divergences. Therefore, processor 202 may also determine that no divergence exists (step 606; no).

On the other hand, if processor 202 determines that divergences exist (step 606; yes), processor 202 may estimate a divergence trend based on the divergences (step 608). A divergence trend, as used herein, may refer to quantity and/or quality of changes of the divergence in direction (e.g., positive, negative, etc.) and/or in speed. Any appropriate type of algorithm may be used to estimate the trend. For example, processor 202 may estimate an increasing or decreasing rate of the divergences.

For example, processor 202 may determine trend based on a plurality of types of mathematical equations (e.g., polynomial, linear, sinusoidal, etc.). In one embodiment, processor 202 may determine that a linear and sinusoidal equation may represent the divergence trend based on the differences and the change rate, etc.

The basic equation for a sinusoidal function is: y=A*Sin (B'*t+C), where A, B', and C are the gain, rate, and phase, respectively, in the sinusoidal function. And the basic equation for a linear function is: y=m*x+B, where m and B are the slope and y intercept, respectively, of the linear function.

In addition to determining the types of equations that may be used during the divergence trend determination, processor 202 may also determine boundaries for the selected one or more equations. Various boundary values may be defined for each variable in the selected one or more equations based on the characteristics of the applications and predetermined criteria.

After estimating the trend, processor 202 may determine a potential failure date for maintenance or repair purposes (step 610). A failure may be reflected by a divergence between the actual values and the model values going beyond a predetermined threshold. Processor 202 may determine that the amount of time after which a failure may occur based on current divergences and the estimated trend. Such failure (current or future) may be addressed by scheduling a maintenance or a repair before the failure materializes. That is, processor 202 may determine remaining time before the divergence trend crosses the threshold value and may schedule the maintenance accordingly.

Further, processor 202 may also notify the potential failure date to other entities (step 612). Processor 202 may notify an operator of work machine 100 results of the performed process. For example, processor 202 may display this information on a console of machine 100 for the operator. Processor 202 may also notify any other hardware components or application software programs of the results via diagnostic output 508. The notification may include information indicating that certain output parameter values and/or certain input parameter values or certain hardware devices or software programs that are likely the causes of potential failures. Further, processor 202 may notify ECM 120 or may notify server 140 such that server 140 may schedule a maintenance or a repair based on the notification from diagnostic and analysis system 130.

Figure 7:
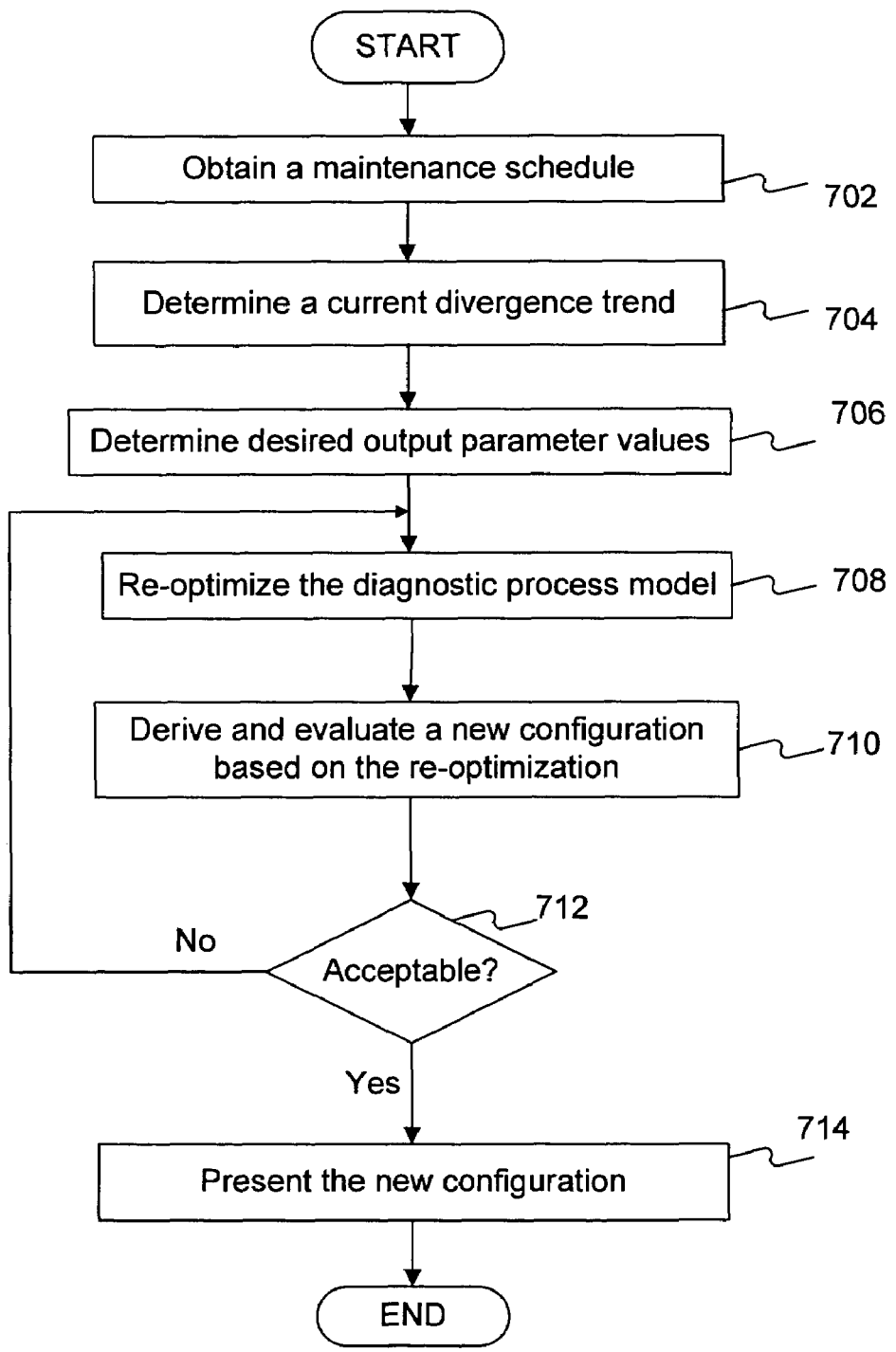
FIG. 7 shows an exemplary reconfiguration process consistent with disclosed embodiments.

In another embodiment, where a maintenance or repair has already been scheduled for engine system 105, diagnostic and analysis system 130 may provide information to determine whether and/or how to continue operating engine system 105 until arrival of the already scheduled repair or maintenance. For example, diagnostic and analysis system 130 may determine or receive a notification of an actual failure or an alarm of a potential failure; and may try to reconfigure operating parameters (e.g., input parameters 502, etc.) to try to repair the failure condition and/or keep engine 110 and ECM 120 in operational condition until the scheduled maintenance. FIG. 7 illustrates an exemplary reconfiguration process performed by logic module 550 and, more specifically, by processor 202.

As shown in FIG. 7, processor 202 may obtain a maintenance schedule of engine system 105 (step 702). Processor 202 may obtain the maintenance schedule from database 206, from machine 100, or from server 140. Processor 202 may obtain information, such as amount of time left before the scheduled maintenance, the type of maintenance, or any known problems, etc., about engine system 105, from the obtained maintenance schedule.

After obtaining the maintenance schedule (step 702), processor 202 may determine a current divergence trend (step 704). As explained above, processor 202 may calculate respective differences between the actual values and the model values to determine divergences between the actual values and the model values; and may also calculate a divergence trend based on an increasing or decreasing rate of the divergences.

Processor 202 may determine desired output parameter values based on the current divergence trend (step 706). For example, processor 202 may determine desired values of output parameters 506 such that predicted output parameter values at the time of scheduled maintenance are within operational scope of engine system 105. The predicted output parameter values may be calculated based on the range of the output parameters and the divergence trend. That is, given the divergence trend and allowable values of output parameters 506 at the time of scheduled maintenance, the desired current values of output parameters 506 may be determined using, for example, any appropriate algorithm. For example, if a full throttle operation may cause engine 110 certain failures or problems that need immediate maintenance or repair, processor 202 may determine a partial throttle operation with which engine 120 may be operated without failure until the scheduled maintenance. In certain embodiments, processor 202 may also determine desired ranges of output parameters values, i.e., desired output constraints based on the scheduled maintenance and the divergence trend. Further, values of output parameters 506, such as cost and time before the schedule maintenance or repair, etc., may represent outputs of an overall system (e.g., machine 100) and may be optimized simultaneously with other desirable output parameters of the overall system, such as power output, useful work completed, etc.

After determining the desired output parameter values or ranges (step 706), processor 202 may re-optimize diagnostic process model 304 based on the desired output parameter values or ranges (step 708). For example, processor 202 may re-optimize diagnostic process model 304 based on the zeta statistic as explained previously with respect to FIG. 4. Further, processor 202 may derive a new configuration (e.g., a set of values of input parameter 502) based on the re-optimization and may also evaluate the new configuration (step 710). The new configuration may also include desired input constraints corresponding to the desired output parameter values or ranges. Further, in one embodiment, cost and time before the schedule maintenance or repair may represent outputs of an overall system (e.g., machine 100) and may be optimized simultaneously with other desirable output parameters of the overall system, such as power output, useful work completed, etc.

Because re-optimization of diagnostic process model 304 may create a new desired input space for input parameters 302 and input parameters 502, processor 202 may derive the new configuration from the new desired input space. Processor 202 may evaluate the new configuration based on various practical factors to determine whether the new configuration is acceptable (step 712). For example, processor 202 may evaluate the new configuration based on economic factors, such as cost and benefit of the new configuration, etc. Other evaluation factors, however, may also be used.

When considering economic factors, because the new configuration may enable engine system 105 to continue operating even though engine system 105 may operate at a partial capacity, the benefit of the new configuration may include the saved time between an early failure point and the scheduled maintenance. Such saved time with a new configuration may have a monetary value for the continued operations. Further, the cost of the new configuration may include the monetary loss of not being able to operating at a full capacity (e.g., loss of partial power, etc.) because of the delayed maintenance or repair.

On the other hand, the cost of an immediate maintenance or repair may include a temporary loss of all capacity of engine system 105, i.e., a total shutdown of engine system 105, for the entire maintenance period. However, the benefit of immediate maintenance or repair may include a monetary gain of operating at full capacity after the completion of the immediate maintenance or repair. Processor 202 may calculate cost/benefit ratios for both scenarios with the new configuration and with the immediate maintenance or repair.

Further, processor 202 may compare the cost/benefit ratio of the new configuration with the cost/benefit ratio of the immediate maintenance. If processor 202 determines that the cost/benefit ratio of the new configuration is larger than the cost/benefit ratio of the immediate maintenance or repair, processor 202 may determine that the new configuration is not acceptable or invalid (step 712; no). On the other hand, if processor 202 determines that the cost/benefit ratio of the new configuration is not larger than the cost/benefit ratio of the immediate maintenance or repair, processor 202 may determine that the new configuration is acceptable or valid (step 712; yes). Although the above steps are disclosed to determine whether the new configuration is acceptable, these steps may also be used to determine the desired output constraints for diagnostic model 300, as explained above.

If processor 202 determines that the new configuration is not acceptable (step 712; no), processor 202 may continue the reconfiguration process at step 708. If processor 202 determines that the new configuration is acceptable (step 712; yes), processor 202 may present the new configuration to a user of machine 100 or any other control systems (step 714). For example, processor 202 may present the new configuration as recommended adjustments to the user on a console of machine 100 such that the user may make the recommended adjustments to control engine system 105. Further, processor 202 may also present the new configuration to server 140 such that server 140 may make decisions based on the new configuration. Server 140 may decide to keep the scheduled maintenance unchanged, to adjust the scheduled maintenance, or to schedule maintenance and repair for similar engine systems in different vehicles. Processor 202 may also present the new configuration to ECM 120, and ECM 120 may also make adjustment accordingly.

Although the disclosed embodiments use engine systems for illustrative purposes, any appropriate system may be used. Such system may be considered to be an asset that requires maintenance scheduling, and the disclosed principles of monitoring, maintenance scheduling, and reconfiguration may be applicable to such assets consistent with disclosed embodiments.

INDUSTRIAL APPLICABILITY

The disclosed systems and methods may provide efficient and accurate solutions for scheduling maintenance or repair of any operational assets, such as machines, engines, generators, etc., for the purpose of maximizing the operational benefit of the assets. For example, the disclosed systems and methods may determine an accurate maintenance or repair date for an asset before a potential failure of the asset such that downtime of the asset may be kept at a minimum. Also, the disclosed systems and methods may adjust current operational configuration of the asset to extend its operations to a predetermined date, that is, to ensure continued operations of the asset until the scheduled maintenance or repair.

Further, the disclosed systems and methods may consider various factors (e.g., economic factors, etc.) when adjusting current operational configuration of the asset. By using the disclosed systems and methods, users of the asset may be able to determine desired maintenance date of an asset and to determine whether to continue operations of the asset or to shut down the asset for maintenance based on, for example, cost/benefit ratios of different scenarios via various interfaces provided by the disclosed systems and methods.

The disclosed systems and methods may also be used in various different fields and industrial applications. For example, manufacturers of assets may use the disclosed systems and methods for including intelligent maintenance and repair capabilities for their products; distributors and/or dealers may use the disclosed systems and methods to plan maintenance and/or repair schedules of their assets; and users of the assets may use the disclosed systems and methods to change or adjust the maintenance schedules and/or the configurations of the assets to achieve desired performances of the assets.

The disclosed systems and methods are not limited in maintaining and/or repairing machine-type assets. Any operational assets, such as computer networks, computer servers, or other electronic equipment may be maintained or repaired by using the principles embodied in the disclosed systems and methods.

Other embodiments, features, aspects, and principles of the disclosed exemplary systems will be apparent to those skilled in the art and may be implemented in various environments and systems.

What is claimed is:

1. A method for reconfiguring an operational system having a plurality of input parameters and a plurality of output parameters, comprising:

obtaining a maintenance schedule of the system;

obtaining a set of actual values of the plurality of input parameters and corresponding actual values of the plurality of output parameters;

calculating corresponding model values of the plurality of output parameters based on an established process model indicative of interrelationships between the plurality of input parameters and the plurality of output parameters;

determining a divergence trend based on current divergences between the actual values and the model values of the plurality of output parameters;

determining a desired set of values of the plurality of output parameters based on the divergence trend and the maintenance schedule; and providing a desired set of input constraints required to achieve the desired set of values of the plurality of output parameters based on the divergence trend and maintenance schedule.

2. The method according to claim 1, wherein the divergence trend is determined based at least one of a sinusoidal equation including a gain, rate, and phase variable and a linear equation including a slope and y-intercept variable.

3. The method according to claim 2, further including:

evaluating the desired set of values of the plurality of input parameters based on economic factor.

4. The method according to claim 3, further including:

determining that the desired set of values of the plurality of input parameters are valid; and reconfiguring the system with the desired set of values of the plurality of input parameters such that the system continues operating until the scheduled maintenance within economic constraints.

5. The method according to claim 4, further including:
displaying the new configuration to a user of the system.

6. The method according to claim 4, further including:
presenting the new configuration to a server communicating with the system to analyze the scheduled maintenance based on the new configuration.

7. The method according to claim 1, wherein providing the desired set of input constraints includes:
obtaining data records associated with input variables of the system and the plurality of output parameters;
selecting the plurality of input parameters from the input variables;
executing the computational model indicative of interrelationships between the plurality of input parameters and the plurality of output parameters based on the data records; and
determining desired respective statistical distributions of the plurality of input parameters of the process model as the valid input space based on a zeta statistic optimization of the process model over the desired set of values of the plurality of output parameters.

8. The method according to claim 7, wherein determining further includes:
determining a candidate set of values of the input parameters with a maximum zeta statistic using a genetic algorithm; and
determining the desired statistical distributions of the input parameters based on the candidate set of values,
wherein the zeta statistic $\zeta$ is represented by:

$$\zeta = \sum_{1}^{j}\sum_{1}^{i} |S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the process model.

9. A method for diagnosing a system having a plurality of input parameters and a plurality of output parameters, comprising:
obtaining a set of actual values of the plurality of input parameters and corresponding actual values of the plurality of output parameters;
calculating corresponding model values of the plurality of output parameters based on an established process model indicative of interrelationships between the plurality of input parameters and the plurality of output parameters;
determining a divergence trend based on current divergences between the actual values and the model values of the plurality of output parameters; and
determining a maintenance schedule of the system based on the divergence trend and the current divergences.

10. The method according to claim 9, further including:
notifying the maintenance schedule of the system to a server communicating with the system.

11. The method according to claim 9, wherein determining the divergence trend further includes:
determining whether the set of values of the plurality of input parameters are valid based on a valid input space created by the process model; and
determining the divergence trend based on the current divergences if the set of values of the plurality of input parameters are valid.

12. The method according to claim 9, wherein determining the maintenance schedule further includes:
identifying an amount of time before a potential failure of the system occurs based on the current divergences and the divergence trend; and
determining the maintenance schedule based on the amount of time.

13. The method according to claim 9, wherein the process model is generated by:
obtaining data records associated with input variables of the system and the plurality of output parameters;
selecting the plurality of input parameters from the input variables;
generating the computational model indicative of interrelationships between the plurality of input parameters and the plurality of output parameters based on the data records; and
determining desired respective statistical distributions of the plurality of input parameters of the process model as the valid input space based on a similarity metric to the data records.

14. The method according to claim 13, wherein generating further includes:
creating a neural network computational model;
training the neural network computational model using the data records; and
validating the neural network computation model using the data records.

15. The method according to claim 13, wherein the similarity metric is based on Euclidean distance between the set of values of the input parameters and overall values of the input parameters in the data records.

16. The method according to claim 13, wherein the similarity metric is based on Mahalanobis distance between the set of values of the input parameters and overall values of the input parameters in the data records.

17. A machine, comprising:
an engine;
an electronic control module configured to control operation of the engine by using actual values of one or more output parameters based on a plurality of input parameters; and
a diagnostic system including a processor, wherein the processor is configured to:
obtain a maintenance schedule of the engine;
obtain a set of actual values of the plurality of input parameters and corresponding actual values of the plurality of output parameters;
calculate corresponding model values of the plurality of output parameters based on an established process model indicative of interrelationships between the plurality of input parameters and the plurality of output parameters;
determine a divergence trend based on current divergences between the actual values and the model values of the plurality of output parameters;
determine a desired set of values of the plurality of output parameters based on the divergence trend and the maintenance schedule; and
provide a desired set of input constraints required to achieve the desired set of values of the plurality of output parameters based on the divergence trend and maintenance schedule.

18. The machine according to claim 17, wherein the divergence trend is determined based at least one of a sinusoidal equation including a gain, rate, and phase variable and a linear equation including a slope and y-intercept variable.

19. The machine according to claim 18, wherein, to identify the potential failure, the processor is further configured to:
evaluate the desired set of values of the plurality of input parameters based on economic factors.

20. The machine according to claim 19, wherein, to identify the potential failure, the processor is further configured to:
determine that the desired set of values of the plurality of input parameters are valid; and
reconfigure the system with the desired set of values of the plurality of input parameters such that the system continues operating until the scheduled maintenance within economic constraints.

21. The machine according to claim 20, wherein, to identify the potential failure, the processor is further configured to:
display the new configuration to a user of the machine.

22. The machine according to claim 20, wherein, to identify the potential failure, the processor is further configured to:
present the new configuration to a server communicating with the machine to analyze the scheduled maintenance based on the new configuration.

23. The machine according to claim 17, wherein the electronic control module is implemented on a field programmable gate array (FPGA) device.

24. The machine according to claim 17, wherein the diagnostic system is implemented on a field programmable gate array (FPGA) device.

* * * * *